Patented May 3, 1949

2,468,989

UNITED STATES PATENT OFFICE 2,468,989

UNCOOKED WRINKLE COMPOSITION CONTAINING SYNTHETIC RUBBER AND CONJUGATED DOUBLE BONDED OIL

Enrique L. Luaces, Dayton, Ohio, assignor to New Wrinkle, Inc., Wilmington, Del., a corporation of Delaware No Drawing. Application June 9, 1945,
Serial No. 598,649

8 Claims. (Cl. 260—23.7)

This invention relates to coating composition, and more particularly deals with coating compositions adapted to dry to a wrinkle.

Hitherto wrinkle drying coating compositions have been of two types: varnish type and alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires cooking of the components at one state or another of the process. The purpose of the present invention is to produce a new type of wrinkle drying coating composition wherein the cooking step is omitted. In other words, the coating compositions which are the subject matter of the present invention are prepared by compounding the component parts thereof without the necessity of cooking.

According to the present invention a wrinkling oil (that is to say, an oil which includes conjugated double bonds in its chemical structure) is admixed with a solution of synthetic rubber in solvent in a ratio of from 10 parts to 50 parts of synthetic rubber (dry basis) to 100 parts of wrinkling oil.

The synthetic rubber solution may be prepared by dissolving the rubber solids in any of many solvents suitable therefor or in mixtures thereof. As indicative of solvents useable for the purpose, the following table is given:

| Excellent | Fair to Good | Diluents |
|---|---|---|
| nitromethane | acetone | benzene |
| nitroethane | methyl ethyl ketone | toluene |
| 1-nitropropane | methyl isobutyl ketone | xylene |
| 2-nitropropane | ethyl acetate | other similar aromatic solvents |
| ethylene dichloride | butyl acetate | |
| chloroform | trichloroethylene | naphtha |
| chlorobenzene | beta-trichloroethylene | benzine |
| chlorotoluene | 1,2,3 trichloroethylene | |
| mixed dichloropentanes | dioxane | |
| | dioxolahe | |

The most complete and rapid solubility is obtained with solvents in the "Excellent" column; however, solvents in the "Fair to good" column are satisfactory in most instances. Solvents in the "Diluent" column should be employed only to cut or thin solutions of synthetic rubber in solvents or mixtures of solvents in the "Excellent" and "Fair to good" columns.

Including nitro aliphatic solvents retards gelling. The chlorinated solvents reduce fire and explosion hazards. The esters and ketones reduce cost and health hazards. The aromatics reduce cost, as do the petroleum hydrocarbons. The following are typical formulas, proportions being by volume:

| | Percent |
|---|---|
| 1. Nitrobenzene or nitromethane | 10–30 |
| Naphtha, toluene or xylene | 90–70 |
| 2. Ethylene dichloride | 10–30 |
| Naphtha, toluene or xylene | 90–70 |
| 3. Chlorotoluene or chlorobenzene | 10–30 |
| Naphtha, toluene or xylene | 90–70 |
| 4. Chlorobenzene | 10–30 |
| Methyl ethyl ketone | 90–70 |
| 5. Nitroethane | 10–30 |
| Methyl ethyl ketone | 90–70 |
| 6. Chlorotoluene | 10–30 |
| Diisopropyl ketone | 90–70 |
| 7. Chlorotoluene | 10–20 |
| Nitroethane | 10–20 |
| Naphtha, toluene or xylene | 80–60 |
| 8. Ethylene dichloride | 10–20 |
| Chlorobenzene | 10–20 |
| Methyl ethyl ketone | 80–60 |
| 9. Butyl acetate | 33⅓ |
| Chlorobenzene | 33⅓ |
| Acetone | 33⅓ |
| 10. Ethylene dichloride | 10 |
| Toluene | 10 |
| Benzene | 80 |
| 11. 1-nitropropane | 25 |
| Acetone | 50 |
| Benzene | 25 |

Obviously, many other combinations may be employed successfully for the purpose.

To the resulting mixture may be added, if so desired, from 40 to 80% of a pigment paste comprising for example, two-thirds pigment and one-third wrinkling oil by weight. This pigment paste is thoroughly blended into the mixture of synthetic rubber solution and wrinkling oil to produce a homogeneous composition.

To this homogeneous composition is added a quantity of solvent such as naphtha, toluene, xylene or mixtures thereof, or any other solvent such as customarily employed in varnish formulations, in quantity sufficient to produce a coating of the desired viscosity.

For example, a coating of suitable viscosity for application by spreading may consist of 40 parts by weight of synthetic rubber solids, 100 parts by weight of wrinkling oil, 60 parts by weight of pigment paste, and 10 parts by weight of naphtha.

The use of synthetic rubber solutions in admixture with wrinkling oils for producing wrinkle drying coating compositions is new in the art; in fact, it has been hitherto considered impossible to use rubber in any form, either natural or synthetic, in wrinkle drying coating compositions of any sort because the rubber acted as an inhibitor of wrinkle formation.

The texture of the wrinkle pattern obtained according to the present invention may be controlled or altered by selection of the type of synthetic rubber used. In addition, wrinkle patterns or textures hitherto unobtainable may be produced varying the amount of synthetic rubber employed in the formulation. In addition, this new type of wrinkle drying coating composition including synthetic rubber responds to temperature variation during the initial drying or texturing period to such an extent that great variety of textures or patterns may be obtained.

It is believed that the underlying theory governing the production of wrinkle drying coating composition including synthetic rubber is as follows:

The mixture of synthetic rubber and wrinkling oil consists of two components which are compatible with each other at the time and under the conditions of mixing and applying; however, during the drying or film-forming period these ingredients separate into distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

The following synthetic rubbers have been used successfully in the practice of this invention:

Butadiene-styrene copolymer
Butadiene-acrylonitrile copolymer
Neoprene
Polyvinyl chloride Any of these synthetic rubbers may be employed successfully in ratios of from 10 parts to 50 parts of rubber solids to each 100 parts of wrinkling oil, and has been so employed in the practice of this invention.

As has been noted hereinbefore, wrinkling oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of fatty oil which includes conjugated double bonds in its chemical structure either in the native state or after treatment causing conjugation of isolated double bonds.

Wrinkle drying coating compositions made according to the method of this invention have been successfully applied on paper, fabric, and other similar flexible materials with great success. The composition has been applied by spraying, spreading, and rolling, and the resulting film has been dried at 130° F. for an initial period of 30 minutes and thereafter for an additional period of from 30 to 60 minutes at 180° F.

The process of producing such wrinkle-coated flexible materials and the products obtained thereby form the subject matter of the assignee's copending application Beynon Serial Number 656,173, filed March 21, 1946, now U. S. Patent 2,460,485.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. As a new composition of matter, a wrinkle drying coating composition comprising a conjugated double-bonded oil and synthetic rubber solution in proportions of 100 parts by weight of said oil to from 10 to 50 parts by weight of dry rubber in an organic solvent, said rubber being a butadiene derivative, selected from the group consisting of butadiene styrene copolymer, butadiene acrylonitrile copolymer and polychloroprene.

2. As a new composition of matter, a wrinkle drying coating composition comprising conjugated double-bonded oil and butadiene-styrene copolymer rubber solution in proportions of 100 parts by weight of said oil to from 10 to 50 parts by weight of said dry rubber in an organic solvent.

3. As a new composition of matter, a wrinkle drying coating composition comprising conjugated double-bonded oil and butadiene-acrylonitrile copolymer rubber in proportions of 100 parts by weight of said oil to from 10 to 50 parts by weight of said dry rubber in an organic solvent.

4. As a new composition of matter, a wrinkle drying coating composition comprising conjugated double-bonded oil and polychloroprene rubber solution in proportions of 100 parts by weight of said oil to from 10 to 50 parts by weight of said dry rubber in an organic solvent.

5. The method of making a wrinkle drying coating composition which comprises admixing conjugated double-bonded oil with butadiene-styrene copolymer rubber solution in proportions of from 10 to 50 parts by weight of said dry rubber dissolved in organic solvent to 100 parts by weight of said oil, adding thereto approximately 40 to 80 parts by weight of a pigment paste comprising two-thirds pigment and one-third conjugated double-bonded oil by weight, and adding to the resulting mixture organic solvent in quantity sufficient to obtain a predetermined viscosity.

6. The method of making a wrinkle drying coating composition which comprises admixing conjugated double-bonded oil with butadiene-acrylonitrile copolymer rubber solution in proportions of from 10 to 50 parts by weight of said dry rubber dissolved in organic solvent to 100 parts by weight of said oil, adding thereto approximately 40 to 80 parts by weight of a pigment paste comprising two-thirds pigment and one-third conjugated double-bonded oil by weight, and adding to the resulting mixture organic solvent in quantity sufficient to obtain a predetermined viscosity.

7. The method of making a wrinkle drying coating composition which comprises admixing conjugated double-bonded oil with polychloroprene rubber solution in proportions of from 10 to 50 parts by weight of said dry rubber dissolved in organic solvent to 100 parts by weight of said oil, adding thereto approximately 40 to 80 parts by weight of a pigment paste comprising two-thirds pigment and one-third conjugated double-bonded oil by weight, and adding to the resulting mixture organic solvent in quantity sufficient to obtain a predetermined viscosity.

8. The method of making a wrinkle drying coating composition which comprises admixing conjugated double-bonded oil with synthetic rubber solution, said rubber being a butadiene derivative selected from the group consisting of butadiene styrene copolymer, butadiene acrylonitrile copolymer, and polychloroprene and said solvent being organic solvent, in proportions of from 10 to 50 parts by weight of dry rubber to 100 parts by weight of said oil, adding thereto approximately 40 to 80 parts by weight of a pigment paste comprising two-thirds pigment and one-third conjugated double-bonded oil by weight, and adding to the resulting mixture organic solvent in quantity sufficient to obtain a predetermined viscosity.

E. L. LUACES.

REFERENCES CITED

The following references are of record in the file of this patent:

UNITED STATES PATENTS

| Number | Name | Date |
|---|---|---|
| 1,938,662 | Lawson | Dec. 12, 1933 |
| 1,967,860 | Carothers et al. | July 24, 1934 |

OTHER REFERENCES

Pages 502 and 503, Official Digest #240, Nov. 1944. (Copy in Div. 50.)